United States Patent [19]

Schaefer et al.

[11] 4,329,055
[45] May 11, 1982

[54] INTERFEROMETER APPARATUS FOR MEASURING THE WAVELENGTHS OF OPTICAL RADIATION

[75] Inventors: Fritz-Peter Schaefer, Goettingen, Fed. Rep. of Germany; Jan Jasny, Warsaw, Poland

[73] Assignee: Max-Planck-Gesellschaft zur Foerderung der Wissenschaften e.V., Goettingen, Fed. Rep. of Germany

[21] Appl. No.: 117,880

[22] Filed: Feb. 4, 1980

[30] Foreign Application Priority Data

Feb. 8, 1979 [DE] Fed. Rep. of Germany ....... 2904836

[51] Int. Cl.³ .............................................. G01B 9/02
[52] U.S. Cl. .................................................. 356/346
[58] Field of Search ....................................... 356/346

[56] References Cited

PUBLICATIONS

Hall et al., "Laser Spectroscopy III, Proceedings of the Third International Conference, Jackson Lake Lodge, Wyoming, 7/4–7/8 1977, pp. 410–426.
Hall et al., "Interferometric Real-Time Display of CW Dye Laser Wavelength with Sub-Doppler Accuracy", Applied Physics Letters, vol. 29, pp. 367–369, 9/76.

Primary Examiner—John K. Corbin
Assistant Examiner—Matthew W. Koren
Attorney, Agent, or Firm—Brumbaugh, Graves, Donohue & Raymond

[57] ABSTRACT

An interferometer system for measuring the wavelength of laser light or and other optical radiation comprises an interferometer with a radiation input for a reference beam of a given wavelength, a sample radiation input for a sample beam of unknown wavelength, and a beam splitter for splitting up an incoming beam into two part-beams, and a system for changing the optical lengths of two part-beam optical paths as used by the reference beam and, parallel to it, the beam whose wavelength is to be measured. There is furthermore a detector for converting output beams from the interferometer into representative electrical signals and a signal processing circuit coupled to the detector means.

Furthermore in the part-beam paths there is an optical part in the form of a parallelepipedic transparent body able to be rotated for the changing of the lengths of the paths of the beams in relation to each other, and a reflector system for reflecting back the part-beams, coming from the turning part, back into themselves.

5 Claims, 3 Drawing Figures

INTERFEROMETER APPARATUS FOR MEASURING THE WAVELENGTHS OF OPTICAL RADIATION

BACKGROUND OF THE INVENTION

The present invention relates to the measuring of optical wavelengths and more specially to an interferometer apparatus for measuring the wavelength of laser radiation.

At the present state of the art, it is no trivial problem to measure the wavelength of optical radiation, such as laser radiation, with an accuracy of over $10^6$. An overview of shortcomings and pitfalls in this field and the newest measuring processes is comprised in the book "Laser Spectroscopy III. Proceedings of the Third International Conference, Jackson Lake Lodge, Wyoming, U.S.A., July 4–8, 1977," by J. L. Hall and J. L. Carlsten, published by Springer-Verlag Berlin-Heidelberg-New York 1977 chapter 9: Laser Wavelength Measurements, pages 410 to 426. The best and most widely used way of measuring laser wavelengths was firstly proposed by J. L. Hall and S. A. Lee (Applied Physics Letters 29, no. 6, Sept. 15, 1976, pages 367 to 369) and is based on the use of a Michelson-interferometer with moving mirrors. In this case, a reference beam whose wavelength has been measured with great accuracy and produced by a stabilized laser (for example an iodine stabilized He-Ne-laser) goes to a photoelectric detector and, somewhat to the side, but nevertheless parallel to the reference beam, a "test" or sample beam (that is to say one whose wavelength is to be measured) goes to a second detector. The interferometer has a beam-splitter by which each of the incoming beams is divided into first and second part-beams, and the length of the optical path travelled by the first part-beams can be varied in relation to the length of the optical path travelled by the other part-beam by movable mirrors. When the mirrors are moved, the output beams from the interferometer are intensity-modulated by the occuring interference so that the two detectors produce electrical output signals with a similar modulation. The modulation frequency of the reference beam and of the test beam is measured, e.g. by counting, and the relation between the wavelengths of the reference and test beam can be calculated from the values obtained. To obtain an accuracy of over $10^6$, the moving mirrors of this known apparatus have to be shifted in position by about 1 m, this needing about 25 seconds. Thus, the known apparatus takes up much space and, because of its great size, great care must be taken to secure a vibration-free support. The apparatus can only be used at the place of its permanent installation and the radiation sources, whose wavelength is to be measured, have to be taken to it.

SUMMARY OF THE INVENTION

One purpose of the present invention is to provide an interferometric apparatus with which the measuring operations may be undertaken more quickly, more simply and with the same accuracy or even with a higher degree of accuracy.

For effecting these and other purposes, in accordance with a preferred embodiment of the invention an interferometer apparatus is provided for measuring the wavelength of optical radiation, more specially laser radiation, said apparatus having a reference radiation beam input for providing a reference beam of a predetermined wavelength, a test or sample radiation beam input providing a sample beam which is offset and parallel to the reference beam, an interferometer, which has a beam splitter for splitting any incoming beam of radiation into two part-beams, and two part-beam optical paths, whose optical lengths in relation to each other may be changed, the optical paths being for the reference beam and, parallel to it, the test beam whose wavelength is to be measured, the reference beam and the test beam being along paths parallel to each other, the apparatus furthermore having photo-electric detector means for converting output beams from the interferometer into representative electrical signals, and a signal processing circuit coupled to the detector means. In accordance with the present invention this apparatus is characterised in that the part-beam paths include a turning or rotably supported optical part, which, when turned, has the effect of changing the lengths travelled by the part-beams in relation to each other, and a reflector system designed for reflecting the part-beams, coming from the turning part, back into themselves.

BRIEF DESCRIPTION OF THE DRAWINGS

Further features, and advantages of the invention become apparent from the following description of a preferred embodiment of the invention.

In the drawings.

DETAILED DESCRIPTION OF A PREFERRED EMBODIMENT OF THE INVENTION

Figure 1:
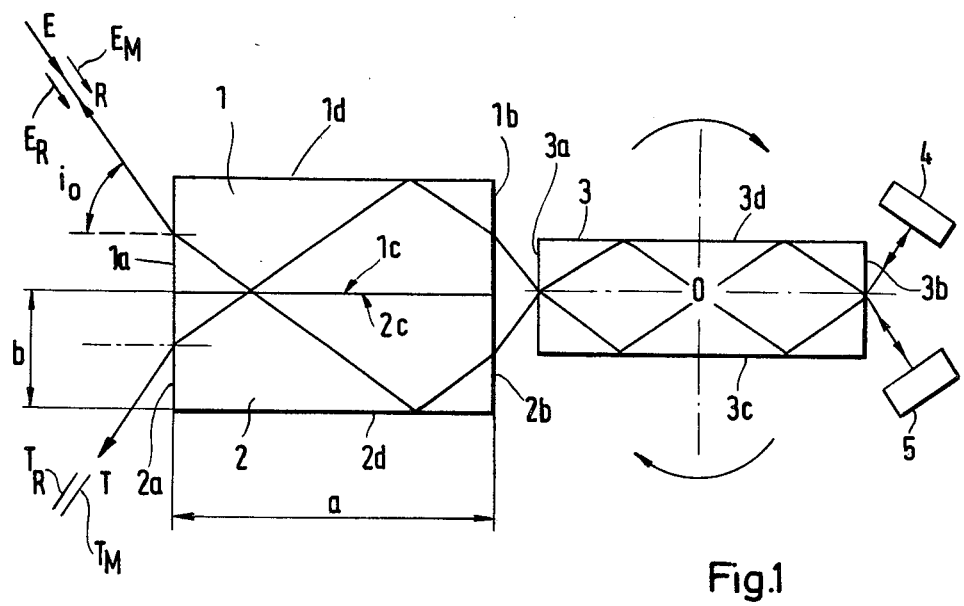
FIG. 1 is a diagrammatic view of the optical portion of an apparatus according to a preferred embodiment of the present invention.

The optical portion, shown in FIG. 1, of a preferred form of the apparatus of the present invention takes the form of a Jasny interferometer. It comprises a beam splitter in the form of two optically transparent bodies 1 and 2, in the present case pieces of quartz having the form of right-angled parallelepipeds of the length a and the height b, and of which four sides, namely the end faces $1a$ and $1b$, and, in the other case, $2a$ and $2b$, together with the side faces $1c$ and $1d$ and, in the other case, $2c$ and $2d$, are optically flat and polished. The side faces $1c$ and $2c$ are placed very near to each other without, however, touching, because they are separated by an 108 nanometer thick air layer, this spacing being fixed by two about 7 mm broad $MgF_2$ spacing structures (not to be seen in the figure) produced by vapor coating on the long-edges of the one piece of quartz. Because of the small distance of the faces $1c$ and $2c$ limiting the air layer, of the bodies 1 and 2, total reflexion at these faces is inhibited or limited and the "interface" between the two quartz pieces acts as a 50% beam splitter at a wavelength of 500 nanometers. This ratio of the intensities of the transmitted and reflected beam portions (part beams) is maintained in the full visible near-ultraviolet and near-infrared spectral ranges at about 50%. The selection of the relation (a/b) of the length as to the height b is such as to be equal to $2n_0$, $n_0$ being the mean refractive index of the material (quartz, that is say for general use, quartz glass) of the bodies 1 and 2. A radiation beam E falling with the Brewster angle ($E_O$) of 55°40' on the middle point of the end face 1a of the body is refracted and then, at the gas air interface 1c, split with a splitting relation of 1:1 into two part-beams which, as will be seen in FIG. 1, go on further, and undergo total reflexion at the free side faces 1d and 2d of the bodies 1 and 2 and then come out from the two other end faces 1b and 2b of the bodies 1 and 2, respectively. The part-beams then go through the one end face 3a of a third body 3 of optically transparent material, more specially quartz, of a length a. With respect to material, form and face properties this third body 3 is best quite the same as the bodies 1 and 2. The height of the body 3 is such that the part-beams coming in through the end face 3a come together after undergoing total reflexion one or more times (preferably two times) at the polished side faces 3c and 3d, at the other end face 3b and then go out of the body 3. The part-beam paths of the interferometer are completed by a reflector system made up of two stationary reflectors or mirrors 4 and 5 causing reflexion of the part-beams coming from the body 3 back into themselves so that the part-beams eventually combine in the beam splitter 1 and 2 to form a reflected beam R and a transmitted beam T, which come out through the end face 1a and, in the other case, the end face 2a.

The body 3 is rotably supported about an axis going through the point O of FIG. 1, that is to say normal to the plane having within it the axes of the beams. If the body 3 is now rotated about this axis, the length of the optical path of the one part-beam will be made shorter, while the length of the optical path of the other part-beam will be made longer by an equal but opposite amount. Given a smooth, unchanging speed of rotation the intensities of the reflected and transmitted beams R and T will undergo opposite sine-law modulation, the frequency being able to be very high, because the body 3 may be rotated with a high speed (if necessary in a vacuum). The optical paths of the beams have the property that the effects of all changes of the surfaces produced by centrifugal force and related polarization effects, and furthermore the effects of errors in adjustment of the body 3 with respect to the rest of the parts of the interferometer for example because of wobble of the axis of rotation or other deficiencies, are cancelling each other out, because the beams go through the body 3 along exactly the same path in forward and backward directions.

The position of the body 3 to be seen in FIG. 1 is representative of the turning angle (or rotation angle) $\Phi$ of 0. For small values of the angle $\Phi$ (that is to say $\Phi$ equal to or less than ±5°) the modulation period $T_1$ of the intensity of the outcoming radiation is generally a linear function of the mechanical rotation period $T_m$:

$$T_1 = K(\Phi,\lambda) T_m \quad (1)$$

$$K(\Phi,\lambda) = \lambda/[4\pi[2 \cos \Phi(a \sin i_o + 2b \cos i_o) - af(\Phi)]] \quad (2)$$

$$f(\Phi) = \sin(i_o+\Phi)\cos(i_o+\Phi)[n^2-\sin^2(i_o+\Phi)]^{-\frac{1}{2}} + \sin(i_o-\Phi)\cos(i_o-\Phi)[n^2-\sin^2(i_o-\Phi)]^{-\frac{1}{2}} \quad (3)$$

in which a and b are the length and height, respectively, of the bodies, $i_o$ is the angle of incidence of the beam E going into the body 1, $\lambda$ is the wavelength of the radiation and n is the refractive index of the bodies 1 and 2 (for example of quartz glass) at the wavelength $\lambda$. The factor $K(\Phi,\lambda)$ is of the order of $10^{-7}$.

So for each turn the body 3 will go through a small angle range from $-\Phi_m$ to $+\Phi_m$, in which the incident beam E goes through the interferometer and comes out of it as a transmitted beam T. Within this angle range, the body 3 obtains a number n of angle positions, in each of which the condition for an interference maximum or constructive interference is fulfilled for a transmitted beam of a given wavelength.

The angle range in which $\Phi$ is greater than $-\Phi_m$ but less than $+\Phi_m$ and in which the beam may be modulated by the interferometer, is mainly dependent on the linearity needed for $T_1$, this being a function of $T_m$, that is to say on the way $\Delta K$ is dependent on the mean value of K as now tabled:

| $\Delta K/K$ | $10^{-5}$ | $10^{-4}$ | $10^{-3}$ |
| --- | --- | --- | --- |
| $\Phi_m$ | about 0.5° | about 1.5° | about 5° |

Although the angle range able to be used may seem to be small, it is to be taken into account that the number N of the modulation periods $T_1$ (is dependent on $\Delta K/K$ and $\lambda$) is of the order $10^4$ to $10^5$.

The structure and operation of the interferometer to be seen in FIG. 1 have been described for the case of only one incoming or incident beam E and, for this reason, only one transmitted beam T. On measuring wavelengths, however, the interferometer has two nearby beams parallel to each other going through it, that is to say a reference beam $E_R$, whose wavelength is fixed or known with great accuracy, and a test beam $E_M$ (that is to say a beam to be measured in its wavelength).

The observations made with respect to the beam E are true for these beams as well in each case and, for this reason, a transmitted modulated reference beam $T_R$ and a transmitted modulated test beam $T_M$ will come out of the interferometer.

These beams $T_R$ and $T_M$ from the interferometer go to a photo-electric detector means comprising for example, a first photodetector 10 and a second photodetector 12 (for example photodiodes or photo-multipliers). The output of the photodetector 10 which provides an electrical signal representative of the modulation of the transmitted reference beam, is coupled to a phase-stabilized multiplier circuit 14 for multiplication of the modulation frequency by 100. The output of the multiplier circuit is coupled to a signal input of a gate 16, whose output is coupled to a first counter 18, the output of the counter 18 being coupled to a printer 20.

The photo-electric detector 12, at whose output there is an electrical signal representative of the modulation of the test beam, is coupled by way of a phase-stabilizing circuit 22 with a second counter 24 which can be set at a given count S. In the present case it is assumed that the counter 24 produces a signal, opening gate 16, to a control input of this gate 16, when the count is less than S. On getting to the count S this signal will be vanish and the gate 16 will, for this reason, be closed. The output signal of the counter 24 is also applied to a control input of the printer, which responds to the termination of the output signal from the counter 24 by printing the count-value of counter 18. The circuit of FIG. 2 and its operations are detailed in the book noted by Hall and Lee, so that more details in this connection will not be necessary.

Figure 2:
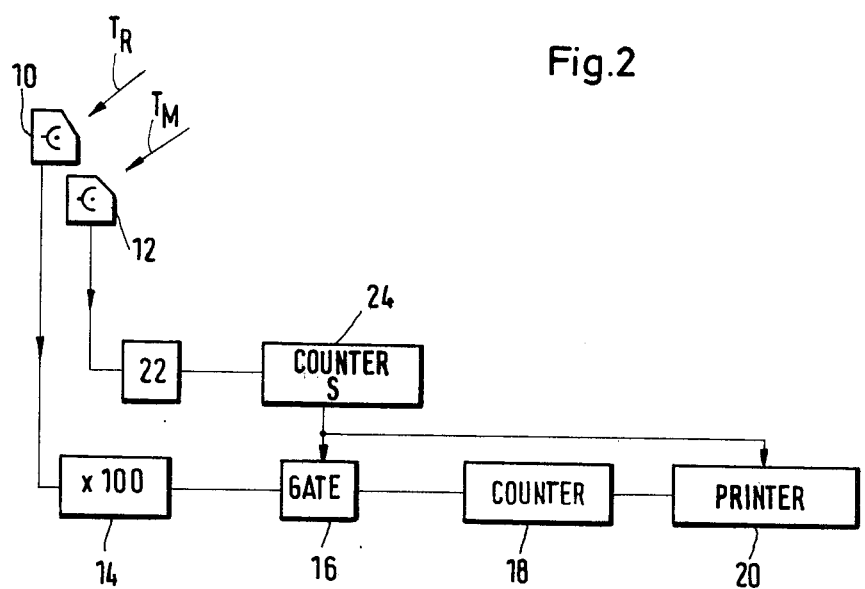
FIG. 2 is a schematic view of a circuit of a photoelectric detector means and signal processing circuit, which may be used in connection with the optical portion shown in FIG. 1.

In the circuit of FIG. 2 the modulation frequency of the reference beam is multiplied by one hundred for division of the modulation period into hundredths. This modulation frequency, after multiplication by one hundred, is counted by counter 18.

If the upper limit for the counting of a frequency i.e. without frequency conversion is taken to be 500 MHz according to the present state of the art, it will be seen that the highest modulation frequency which may be used is 5 MHz. If the bodies 1,2 and 3 have a length a of 58.0 mm and a height b of 19.8 mm, for a wavelength of 500 nanometers it may be seen that the frequency of rotation of the body 3 is 2.5 Hz, the turning cycle or period being 0.4 sec. Because the measuring in an angle range of about $-9°$ to $+9°$ may be taken about the 0° position of FIG. 1, the measuring time in fact is only 1/20 of the full turning time, that is to say 20 msec. So the measuring time possible with the apparatus is several orders smaller than the measuring time possible with interferometers having optical parts which are linearly moved. The number of modulation periods or cycles, which are gone through in the case of a wavelength of 500 nanometers in the angle range of 18° noted, is about 60,000. Because measuring takes place right down to one hundredth of a period of cycle, the greatest possible system error at this wavelength is $1.6.10^{-7}$ and will be smaller in the case of longer wavelengths and greater in the case of shorter wavelengths, this being dependent on the number of modulation periods able to be counted in a given case.

Figure 3:
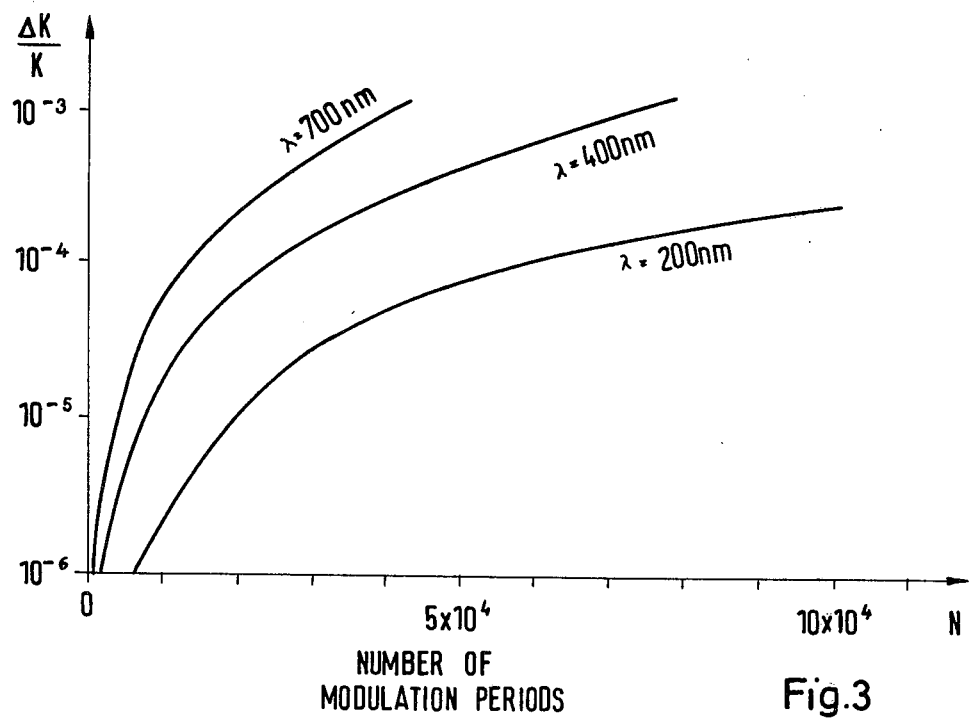
FIG. 3 is a graph for making clear the function of the interferometer of FIG. 1.

The way in which the number N of modulation periods is dependent on the size of $\Delta K/K$ is presented in a graph in FIG. 3.

It will be seen from the size figures, given, in the account of the interferometer, for the turning quartz piece and the size figures of generally the same order, of the beam splitter and the mirrors that the apparatus of the present invention is in need of little space and, for this reason, the effects of vibration or shaking will be low. The body 3 may, more specially, be fixed to the shaft of a DC motor whose speed of turning may be electronically controlled. The zeroing and putting into operation of the counters 18 and 24 may be undertaken in a known way using a signal produced by the turning of the body 3: for example it is possible to have on the shaft, with the body 3 on it, a concave mirror, in front of which, at a distance equal to the radius of the curved face of the concave mirror, there is a slit, behind which there are placed one above the other a light source, and a photodiode or some other photo-electric detector. On each turn of the motor the light source is imaged onto the photodiode for a short time and a short pulse produced which, as noted, may be used for zeroing and starting the counters. By pivoting the system consisting of the slit, the light source and the light detector, in the direction of rotation of the body 3, or in the opposite direction, about its axis of rotation, the timing of the pulse with respect to the angle zero position of the body 3 may retarded or advanced, respectively. The bodies 1 and 2 and the mirrors 4 and 5 are, preferably, fixed on a baseplate of quartz or glass ceramic material with a low coefficient of thermal expansion by molecular adhesion, i.e., by producing very true, even surfaces and forcing them together, or by cement (not to be seen in detail in the figures) in order to secure a specially high degree of thermal stability of the structure.

We claim:

1. An interferometer apparatus for measuring the wavelengths of optical radiation, more specifically laser radiation, comprising:
   an interferometer having
      a reference radiation input for a reference beam of a given first wavelength,
      a sample beam input for a sample beam of a second wavelength,
      a beam splitter for splitting the reference and sample beams each into a pair of part-beams and with two part-beam optical paths, whose optical lengths may be changed in relation to each other, and designed for the reference beam and, parallel to it, for the sample beam, whose wave-lengths is to be measured, along two lines parallel to each other, and for combining returning part-beams into an output beam,
      a rotatably supported optical part which is arranged in the part-beam paths and which when rotated has the effect of changing the length of the paths of the part-beams in relation to each other,
      and a reflector system for reflexion of the part-beams, coming from the turning part, back into themselves,
   a photo-electric detector means for converting the output beams into representative electrical signals,
   and a processing circuit coupled with the detector means.

2. An apparatus as claimed in claim 1, characterised in that the beam splitter comprises two optically transparent parallelepiped bodies (1, 2) each with two end faces (1a, 1b and, in the other case, 2a, 2b) for the beams or part-beams to go into the bodies and to come from them, and, in each case, two side faces (1c and 2c), of which the one (1c) of the one body (1) is spaced by such a small distance from the face (2c) of the other body (2) that total reflexion is inhibited and a beam falling at a slope on the side faces undergoes, in each case, about 50% reflexion, while the other about 50% of the beam is let through.

3. An apparatus as claimed in claim 1 or claim 2, characterised in that the rotatable optical part (3), as seen in the plane of the part-beam paths, has four right-angled corners and is so sized that in the case of the in-symmetry position of the rotable part (3), the part-beams, in each case, go into and come from generally the middle of one end face and undergo reflexion at least once in each case at the side faces.

4. An apparatus as claimed in claim 1, characterised in that the signal processing circuit includes two counters, coupled with respective outputs of the photo-electric detector means, for the counting at the same time of modulation periods of the reference and sample output beams coming from the interferometer, and has a control circuit for stopping the one counter when the other counter has counted to a given count.

5. An apparatus as claimed in claim 4, characterised in that a frequency miltiplier is coupled between the output of the photo-electric detector means and the input of the counter for counting the modulation periods of the signal derived from the reference output beam.

* * * * *